(12) United States Patent
Trombat (10) Patent No.: US 10,072,712 B2
(45) Date of Patent: Sep. 11, 2018

(54) SHAFT COUPLING ARRANGEMENT

(71) Applicant: GM GLOBAL TECHNOLOGY OPERATIONS LLC, Detroit, MI (US)

(72) Inventor: Steven G. Trombat, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 492 days.

(21) Appl. No.: 14/743,175

(22) Filed: Jun. 18, 2015

(65) Prior Publication Data

US 2016/0369847 A1    Dec. 22, 2016

(51) Int. Cl.
*F16D 1/10* (2006.01)

(52) U.S. Cl.
CPC .......... *F16D 1/10* (2013.01); *F16D 2001/103* (2013.01); *Y10T 403/7035* (2015.01)

(58) Field of Classification Search
CPC .................... Y01T 403/7035; F16D 2001/103
See application file for complete search history.

(56) References Cited

U.S. PATENT DOCUMENTS

| | | | | |
|---|---|---|---|---|
| RE20,270 E | * | 2/1937 | Matthews et al. | F16D 3/06 403/359.6 |
| 4,115,022 A | * | 9/1978 | Orain | F16D 3/06 192/108 |
| 4,175,404 A | * | 11/1979 | Schopf | F16D 1/06 403/359.6 |
| 4,552,544 A | * | 11/1985 | Beckman | F16C 3/03 403/359.6 |
| 5,527,126 A | * | 6/1996 | Digel | B60K 17/22 403/280 |
| 6,553,628 B2 | * | 4/2003 | Newman | A46B 17/02 15/145 |
| 8,353,775 B2 | * | 1/2013 | Kamikawa | B60B 27/0005 403/359.6 |
| 2005/0107169 A1 | * | 5/2005 | Sakurai | F16D 1/06 464/179 |
| 2006/0217210 A1 | * | 9/2006 | Gibson | F16C 3/03 464/183 |
| 2006/0291954 A1 | * | 12/2006 | Igarashi | F16D 1/101 403/359.1 |
| 2007/0178975 A1 | * | 8/2007 | Neugebauer | F16C 3/03 464/51 |

(Continued)

FOREIGN PATENT DOCUMENTS

FR    2918726    *    1/2009

*Primary Examiner* — Frederick Lyndon Lagman
(74) *Attorney, Agent, or Firm* — Cantor Colburn LLP (57) ABSTRACT

A rotational coupling arrangement, such as for use with a vehicle, is provided. The coupling arrangement includes a first rotational component have at least one straight groove, the groove having a sidewall. A second rotational component is coupled to the first rotational component, the second rotational component having at least one projection. The at least one projection having a linear profile between a first end and a second end, the at least one projection having a first section adjacent the first end and a second section adjacent the second end. The first section is sized to define a first gap between the first section and the sidewall, the second section being sized to define a second gap between the second section and the sidewall. The second gap is smaller than the first gap.

14 Claims, 6 Drawing Sheets

(56) References Cited

U.S. PATENT DOCUMENTS

| | | | |
|---|---|---|---|
| 2008/0152424 A1* | 6/2008 | Igarashi | F16D 1/101 403/359.6 |
| 2009/0186709 A1* | 7/2009 | Igarashi | F16D 1/101 464/149 |
| 2009/0270187 A1* | 10/2009 | Matsubara | F16C 3/02 464/143 |
| 2010/0303537 A1* | 12/2010 | Brown | F16D 1/101 403/14 |
| 2014/0193195 A1* | 7/2014 | Merz | B21B 35/143 403/359.6 |
| 2015/0125269 A1* | 5/2015 | Bois | F01D 5/026 415/122.1 |

* cited by examiner

SHAFT COUPLING ARRANGEMENT

FIELD OF THE INVENTION

The subject invention relates to an arrangement for coupling shafts, and more particularly, to a coupling arrangement using splines that have improved manufacturability and assembly characteristics.

BACKGROUND

Vehicles, such as automobiles and trucks for example, include an axle assembly that transmits rotational energy developed by the vehicle engine to the wheels. The axle assembly will typically include a housing having a differential gear set. The differential gear set includes a planetary gear train that allows the wheels of the vehicle to turn at different rotational speeds. This allows an outer wheel to rotate faster than the inner wheel during a turn.

In these assemblies, there are a number of locations where the shafts need to be coupled so as to transmit rotational energy from one component to another. One way shafts are coupled is by the use of a spline. A spline is a type of keyed fitting where one of the components includes a groove and the other component includes a projection or key that fits within the groove. The interaction of the projection with the groove transmits rotational energy. In vehicles, it is desirable to maintain a tight or interference fit between the projection and the groove to avoid excessive backlash, which can cause undesired noise. Commonly, vehicles will use helical splines where at least one of the groove or projection will have a helical angle. While helical splines perform well and with low backlash, the cost of manufacture is higher and the stress distribution may not be as desired.

Accordingly, it is desirable to provide a shaft coupling arrangement that improves the contact stress distribution and facilitates assembly with improved manufacturability.

SUMMARY OF THE INVENTION

In one exemplary embodiment of the invention, a rotational coupling arrangement is provided. The coupling arrangement includes a first rotational component have at least one straight groove, the groove having a sidewall. A second rotational component is coupled to the first rotational component. The second rotational component includes at least one projection having a linear profile between a first end and a second end. The at least one projection further includes a first section adjacent the first end and a second section adjacent the second end. The first section is sized to define a first gap between the first section and the sidewall, the second section is sized to define a second gap between the second section and the sidewall, the second gap being smaller than the first gap.

In another exemplary embodiment of the invention, a method of assembling rotational components is provided. The method includes providing a first rotational component having a straight groove, the groove having a sidewall. A second rotational component is provided having at least one projection, the at least one projection having a linear profile between a first end and a second end, the at least one projection having a first section adjacent the first end and a second section adjacent the second end. The first section is aligned into the groove, the first section and the sidewall, the first section and the sidewall defining a first gap. The second rotational component is axially moved relative to the first rotational component. The second section is inserted into the groove, the second section and the side wall defining a second gap, the second gap being smaller than the first gap. The second rotational component is slid axially relative to the first rotational component until an end of the second section is arranged within the groove.

In yet another exemplary embodiment of the invention, a vehicle is provided. The vehicle includes a first rotational component have at least one straight groove, the groove having a sidewall. A second rotational component is coupled to the first rotational component, the second rotational component having at least one projection. The at least one projection includes a linear profile between a first end and a second end. The at least one projection further includes a first section adjacent the first end and a second section adjacent the second end. The first section being sized to define a first gap between the first section and the sidewall, the second section being sized to define a second gap between the second section and the sidewall, the second gap being smaller than the first gap.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Figure 1:
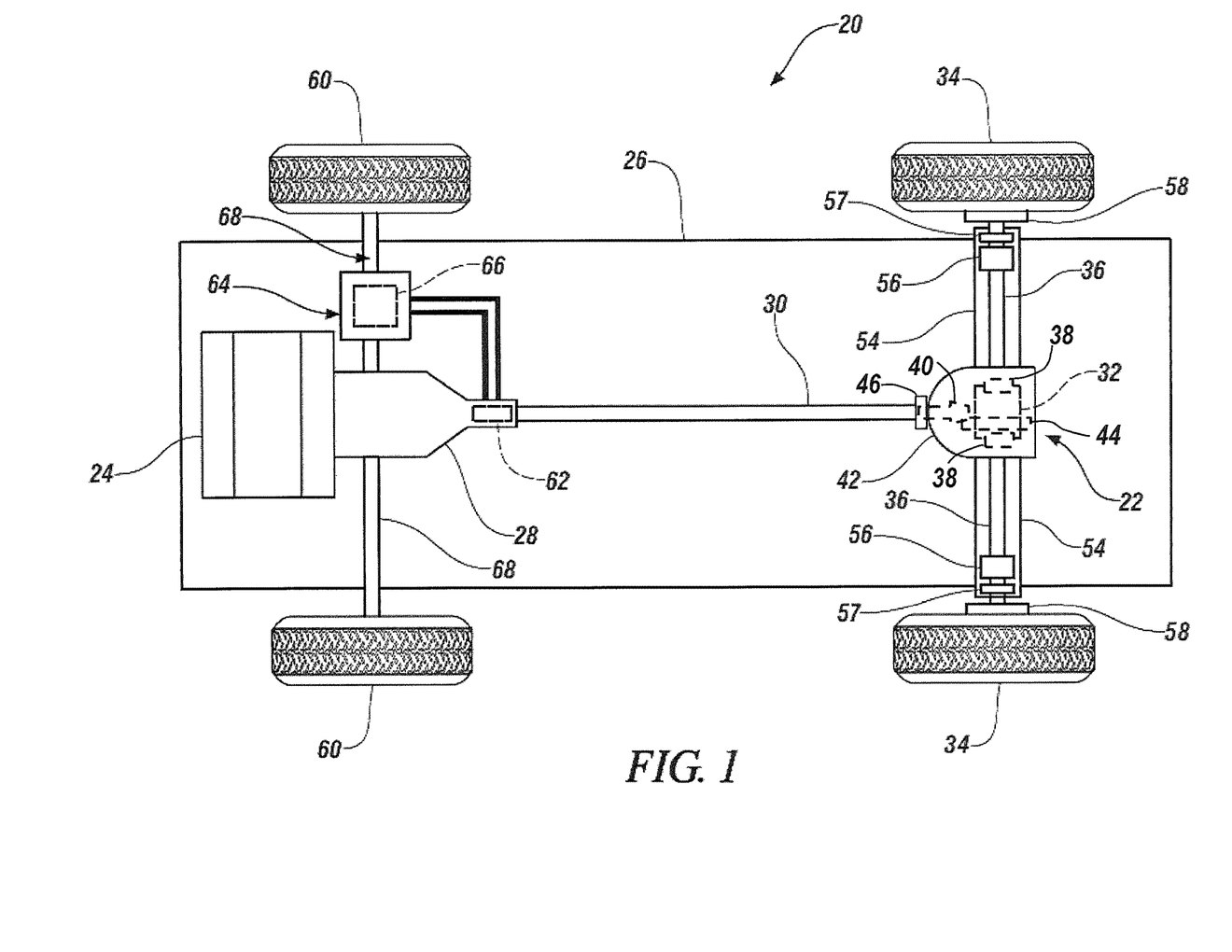
FIG. 1 is a schematic plan view of a vehicle having an axle assembly in accordance with an embodiment of the invention.
Figure 2:
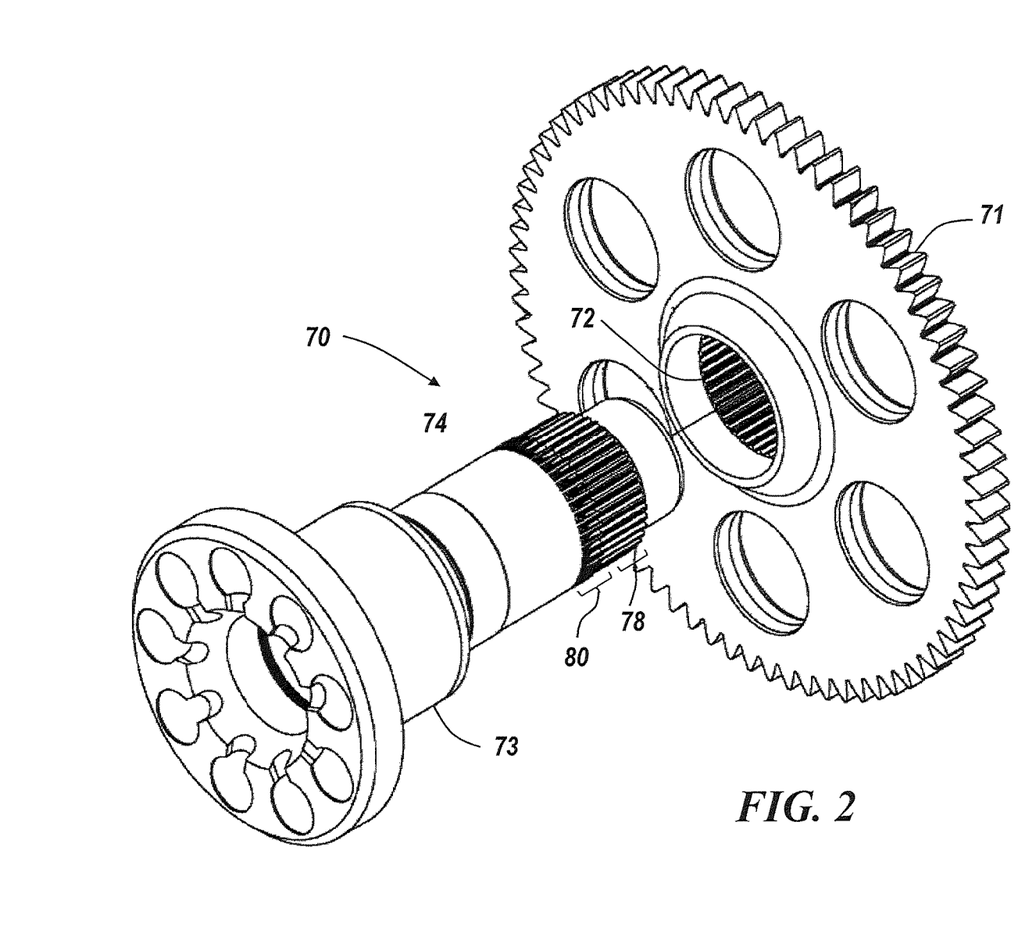
FIG. 2 is a perspective view of a shaft and gear assembly having a spline connection in accordance with an embodiment of the invention.

In accordance with an embodiment of the invention, FIG. 1 illustrates a vehicle 20 having an axle assembly 22. It should be appreciated that the vehicle 20 may be an automobile, truck, van or sport utility vehicle for example. As used herein, the term vehicle is not limited to just an automobile, truck, van or sport utility vehicle, but may also include any self-propelled or towed conveyance suitable for transporting a burden. The vehicle 20 may include an engine 24, such as a gasoline or diesel fueled internal combustion engine. The engine 24 may further be a hybrid type engine that combines an internal combustion engine with an electric motor for example. The engine 24 and axle assembly 22 are coupled to a frame or other chassis structure 26. The engine 24 is coupled to the axle assembly 22 by a transmission 28 and a driveshaft 30. The transmission 28 may be configured to reduce the rotational velocity and increase the torque of the engine output. This modified output is then transmitted to the axle assembly 22 via the driveshaft 30. The axle assembly 22 transmits the output torque from the driveshaft 30 through a differential gear set 32 to a pair of driven-wheels 34 via axles 36.

The differential gear set 32 is arranged within a differential housing 42. The differential gear set 32 receives the output from the driveshaft 30 via a pinion 40 that transmits the torque to a ring gear 44. The pinion 40 includes a shaft that is coupled to the driveshaft 30 by a flange 46. The differential gear set 32 is supported for rotation within the housing 42 by a pair of differential bearings. The differential gear set 32 includes side gears 38 arranged within a housing 42 that are coupled to and support one end of the axles 36. As will be discussed in more detail herein, the coupling of rotational components may be accomplished using a spline connection.

In one embodiment, each axle 36 extends through the bore into an axle tube 54. The axle tube 54 includes a hollow interior that extends the length thereof. At one end of the axle tube 54 a bearing 56 is mounted to support the end of the axle 36 adjacent the driven-wheel 34. A shaft seal 57 is located between the bearing 56 and the wheel 34. A wheel mounting flange 58 is coupled to the end of the axle 36 adjacent the bearing 56. The flange 58 provides an interface for mounting of the driven-wheel 34.

The vehicle 24 further includes a second set of wheels 60 arranged adjacent the engine 24. In one embodiment, the second set of wheels 60 is also configured to receive output from the engine 24. This is sometimes referred to as a four-wheel or an all-wheel drive configuration. In this embodiment, the vehicle 20 may include a transfer case 62 that divides the output from the transmission 28 between the front and rear driven wheels 34, 60. The transfer case 62 transmits a portion of the output to a front axle assembly 64, which may include additional components such as a differential gear set 66 and axles 68 that transmit the output to the wheels 60.

It should be appreciated that within the axle assemblies 22, 64, the transmission 28, the driveshaft 30 and the differential gear sets 32, 66 there are a number of interfaces where a first rotational component is coupled to a second rotational component to transfer rotational energy or torque, such as the flange 46 to the pinion 40 or the side gears 38 to the axles 36 for example. It should further be appreciated that it is desirable to reduce or minimize the backlash between the first and second rotational components to avoid unnecessary noise that may be perceived by the vehicle operator.

Referring now to FIGS. 2-6, an exemplary spline coupling arrangement 70 is shown that allows for the coupling of a first rotational component 71 to a second rotational component 73. In this embodiment, the spline coupling arrangement 70 includes a plurality of grooves 72 formed in a first rotational component 71 and a plurality of teeth or projection 74 formed in the second rotational component, such as the pinion 40 for example. The projection 74 is sized to engage at least a portion of the sidewall 76 of the groove 72 to allow a transfer of torque between the first rotational component and the second rotational component. It should be appreciated that FIGS. 4-6 only a single projection and groove is illustrated for clarity, however the first rotational component 71 and second rotational component 73 may have any number of projections and grooves spaced about the periphery and aligned to cooperate with each other in the transmission of torque. It should further be appreciated that while embodiments herein may describe the first and second rotational components in terms of the pinion 40 and flange 46, this is for exemplary purposes and the claimed invention should not be so limited.

Figure 3:
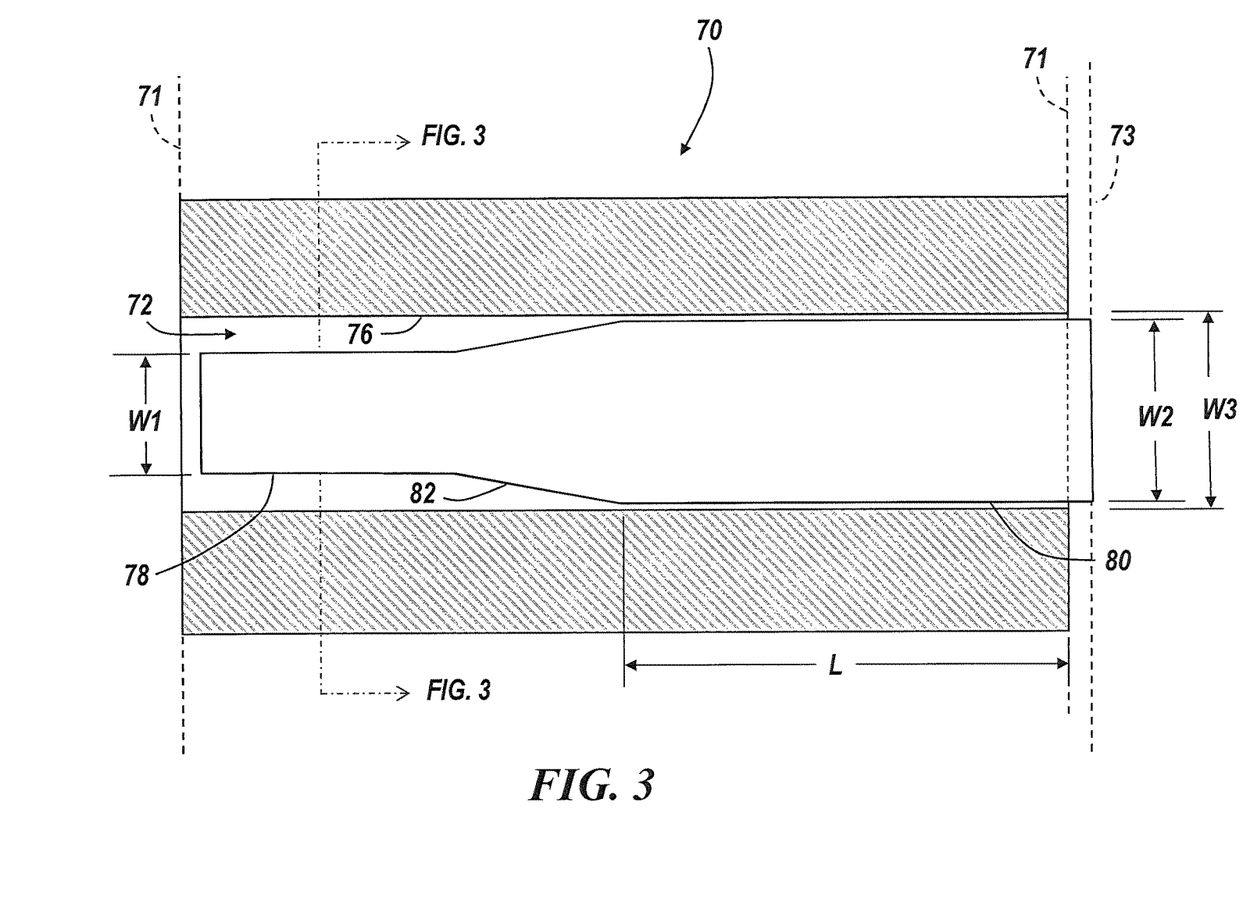
FIG. 3 is a partial sectional plan view of a spline used for coupling shafts in the axle assembly of FIG. 1.

The projection 74 includes a first section 78, a second section 80 and a transition section 82. The first section 78 and second section 80 are generally linear or straight along the length of the projection 74. The transition section 82 has an angular orientation that extends from the first section 78 to the second section 80. The groove 72 is generally linear or straight along its length. The second section 80 has a length L that is sized to provide the desired amount of contact stress distribution for the spline coupling arrangement 70. In one embodiment, the projection 74 has a trapezoidal shape; however, other shapes such as an involute shape may be used.

The first section 78 has a first width W1 and a first height H1. The second section 80 has a second width W2 and a second height H2. The first width W1 is smaller than the second width W2 and the first height H1 is smaller than the second height H2. The second width W2 is slightly smaller than the width W3 of the groove 72. In one embodiment, the width W2 is selected to have an interference fit with the groove 72. The transition section 82 provides a tapered surface between the first section 78 and second section 80.

Figure 4:
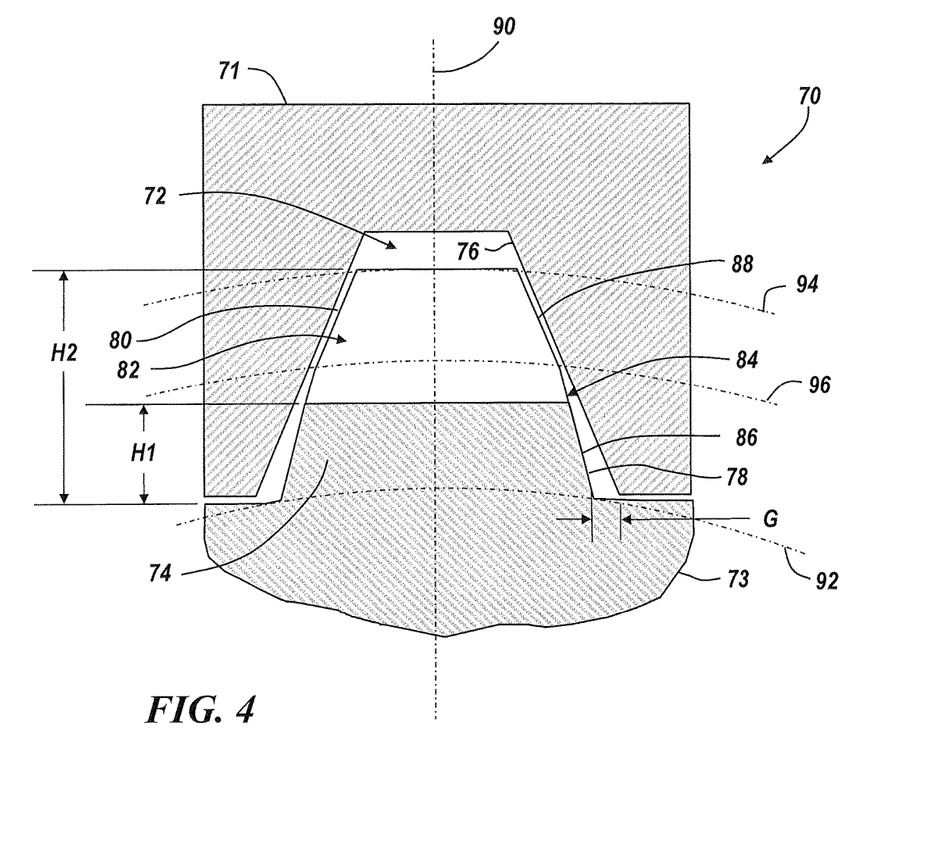
FIG. 4 is a partial sectional end view of the spline of FIG. 3.
Figure 5:
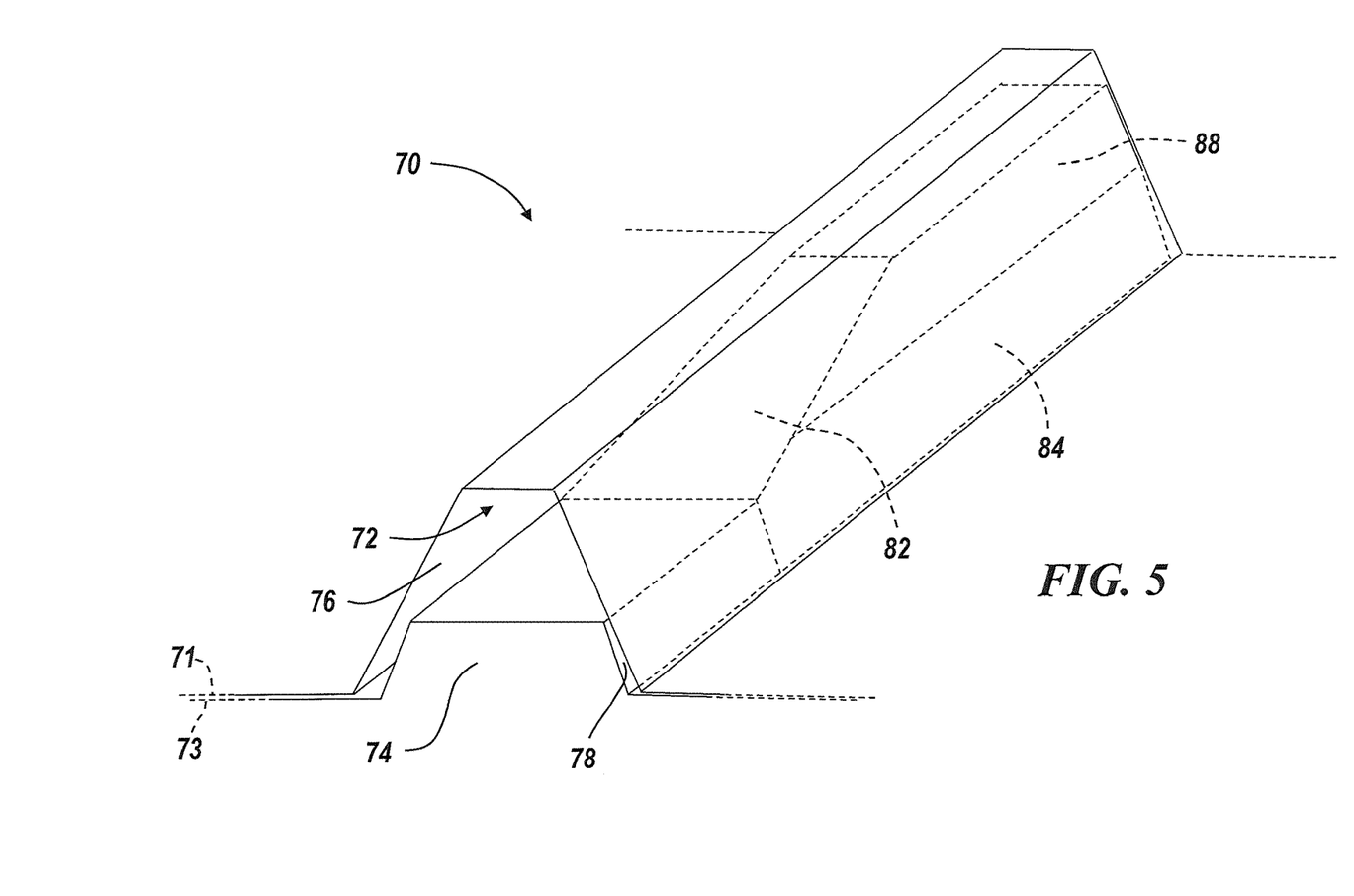
FIG. 5 is a partial isometric view of the spline of FIG. 3.

In one embodiment, shown in FIG. 4, the projection 74 includes a sidewall 84 with a multi-faceted profile. The sidewall 84 includes an inner wall 86 arranged on a first angle and an outer wall 88 arranged on a second angle relative to a centerline 90 extending through the center of the projection 74. The inner wall 86 extends along the length of the projection 74 and is sized to define a gap G between the inner wall 86 and the sidewall 76 of groove 72 at the minor diameter 92 of the projection 74. It should be appreciated that the gap G facilitates the initial insertion of the second rotational component into the first rotational component. In one embodiment, the angle of the inner wall 86 is smaller than the angle of the sidewall 76 (relative to the centerline 90) such that the gap G decreases as the inner wall 86 extends towards the major diameter 94

The outer wall 88 is arranged on an angle that is larger than the angle of the inner wall 86. In one embodiment, the outer wall 88 is arranged on the same angle relative to the centerline 90 as the sidewall 76. The outer wall 88 may be sized to define a gap between the outer wall 88 and the sidewall 76. In other embodiments, the outer wall 88 may be sized to provide an interference fit with the sidewall 76. In still other embodiments, the outer wall 88 may be sized to provide a nominally line-on-line fit with the sidewall 76. The line of transition from the inner wall 86 to the outer wall 88 may be located at the pitch diameter 96 of the projection 74.

It should be appreciated that this spline coupling arrangement 70 provides advantages in manufacturability, reduction of costs, ease of assembly and increase in the distribution of contact stresses. Since the first section 78 is sized to provide the gap G, the assembly of the first rotational component with the second rotational component is facilitated as the components are free to move axially with the gap between the projection 74 and the sidewall 76 reducing as the second section 80 enters the groove 72. Since all of the features are straight (along the length of the coupling arrangement 70), the fabrication of the features such as the groove 72 and the projection 74 are simplified and are easier to inspect. It should be appreciated that this combination of advantages reduces the cost of manufacturing and assembly.

Figure 6:
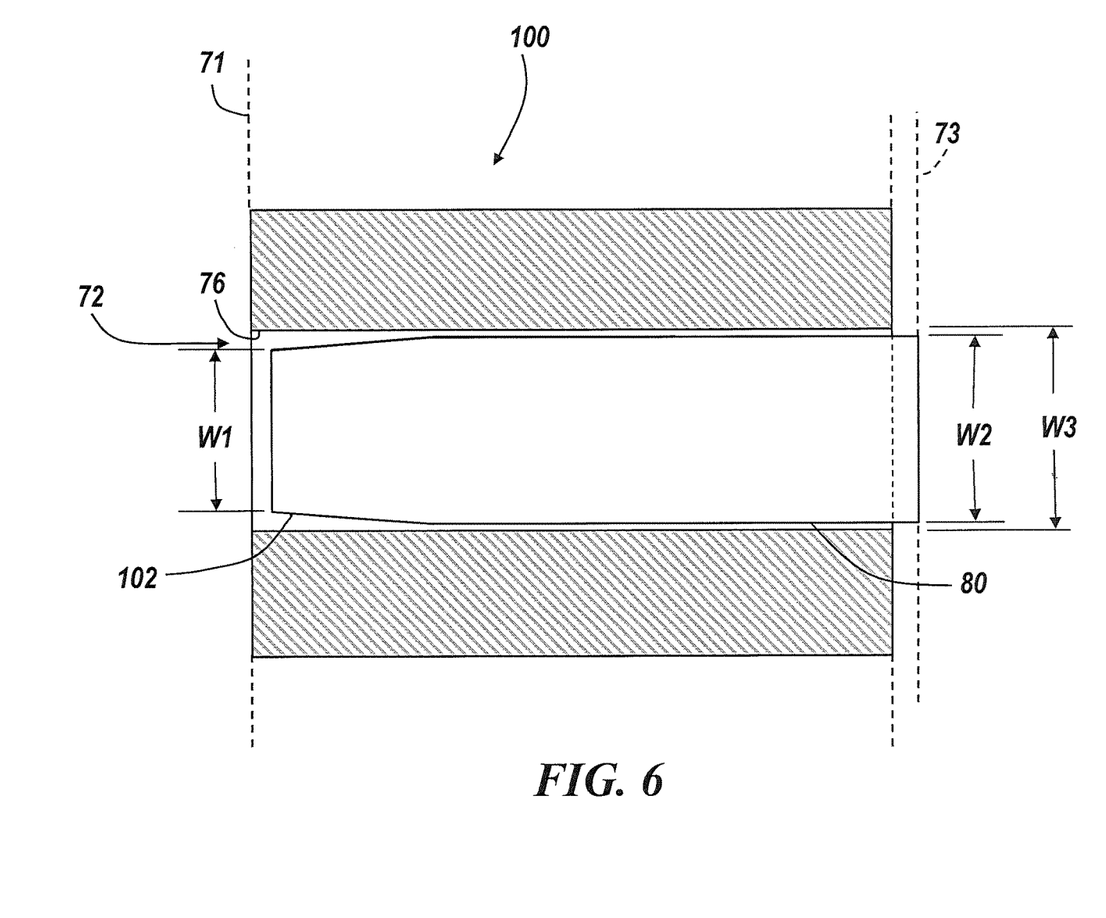
FIG. 6 is a partial sectional plan view of a spline used for coupling shafts in an axle assembly of FIG. 1 in accordance with another embodiment of the invention.

In another embodiment shown in FIG. 6, a spline coupling arrangement 100 is shown. The projection has a constant height along its length. An end of the projection has a first width W1 that tapers to a width W2 at the intersection with the second section 80. The angle of the sidewall 102 remains constant between the end of the projection 74 and the intersection with the second section 80. The width W2 is sized to provide a small gap between the side of second section 80 and the sidewall 76. It should be appreciated that this embodiment provides similar advantages to those described above in facilitating the assembly of the first and second rotational components and improves the manufacturability of the spline coupling arrangement 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A rotational coupling arrangement comprising:
    a first rotational component having at least one straight groove, the groove having a sidewall;
    a second rotational component coupled to the first rotational component, the second rotational component having at least one projection, the at least one projection having a linear profile between a first end and a second end, the at least one projection having a first section adjacent the first end and a second section adjacent the second end, the first section being sized to define a first gap between the first section and the sidewall, the second section being sized to define a second gap between the second section and the sidewall, the second gap being smaller than the first gap, the first section further having a first height and the second section having a second height, the first height being smaller than the second height;
    wherein the first section has a first width and the second section has a second width, the first width being smaller than the second width;
    wherein the at least one projection further comprises a transition section between the first section and the second section;
    wherein the first section includes an inner wall arranged on a first angle to a first centerline extending through the center of the projection; and
    wherein the sidewall is arranged on a second angle relative to a second centerline extending through the center of the groove, the first angle being smaller than the second angle.

2. The rotational coupling arrangement of claim 1 wherein the second section includes an outer wall arranged on a third angle to the first centerline, the first angle being smaller than the third angle.

3. The rotational coupling arrangement of claim 2 wherein the second angle is equal to the third angle.

4. The rotational coupling arrangement of claim 3 wherein the inner wall intersects the outer wall at a pitch diameter of the at least one projection.

5. The rotational coupling arrangement of claim 1 wherein the first section continuously tapers from the first width to the second width.

6. The rotational coupling arrangement of claim 5 wherein the at least one projection includes a sidewall arranged on an angle relative to a centerline extending through the center of the at least one projection, the angle being constant along a length of the at least one projection.

7. A method of assembling rotational components comprising:
    providing a first rotational component having a straight groove, the groove having a sidewall;
    providing a second rotational component having at least one projection, the at least one projection having a linear profile between a first end and a second end, the at least one projection having a first section adjacent the first end and a second section adjacent the second end;
    aligning the first section into the groove, the first section and the sidewall, the first section and the sidewall defining a first gap;
    axially moving the second rotational component relative to the first rotational component;
    inserting the second section into the groove, the second section and the side wall defining a second gap, the second gap being smaller than the first gap;
    axially sliding the second rotational component relative to the first rotational component until an end of the second section is arranged within the groove;
    wherein the first section includes an inner wall, the inner wall arranged on a first angle relative to a centerline extending through the center of the at least one projection;
    wherein the sidewall is arranged on a second angle relative to the centerline; and
    wherein the first angle and second angle are configured to decrease the size of the first gap from a minor diameter of the at least one projection to a pitch diameter of the at least one projection.

8. The method of claim 7 wherein the at least one projection includes a transition section arranged between the first section and second section.

9. The method of claim 7 wherein the first section continuously tapers from an end to the second section.

10. A vehicle comprising:
    a first rotational component having at least one straight groove, the groove having a sidewall; and
    a second rotational component coupled to the first rotational component, the second rotational component having at least one projection, the at least one projection having a linear profile between a first end and a second end, the at least one projection having a first section adjacent the first end and a second section adjacent the second end, the first section being sized to define a first gap between the first section and the sidewall, the second section being sized to define a second gap between the second section and the sidewall, the second gap being smaller than the first gap;
    wherein the first section includes an inner wall arranged on a first angle to a first centerline extending through the center of the projection and the sidewall is arranged on a second angle relative to a second centerline extending through the center of the groove, the first angle being smaller than the second angle.

11. The vehicle of claim 10 wherein the at least one projection further comprises a transition section between the first section and the second section.

12. The vehicle of claim 10 wherein the first section has an end with a first width and the second section has a second width, the first width being smaller than the second width, the first section continuously tapering from the end to the second section.

13. The vehicle of claim 10 wherein the first rotational component is a flange and the second rotational component is a pinion.

14. The vehicle of claim 10 wherein the first rotational component is a side gear and the second rotational component is an axle.

\* \* \* \* \*